No. 713,745. Patented Nov. 18, 1902.
B. BUTLER.
HAND CART.
(Application filed May 13, 1902.)
(No Model.) 2 Sheets—Sheet 1.
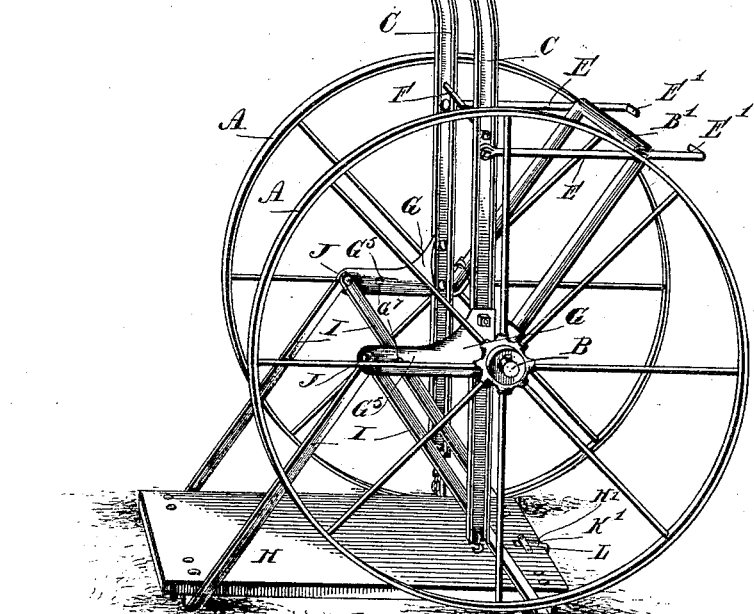
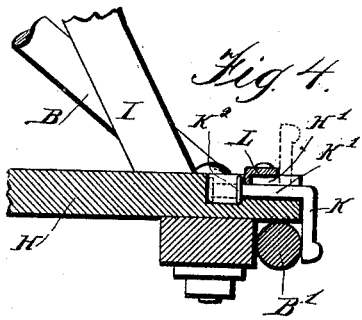
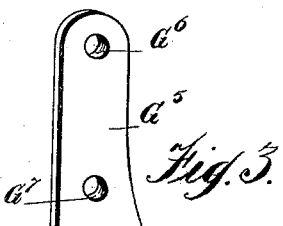
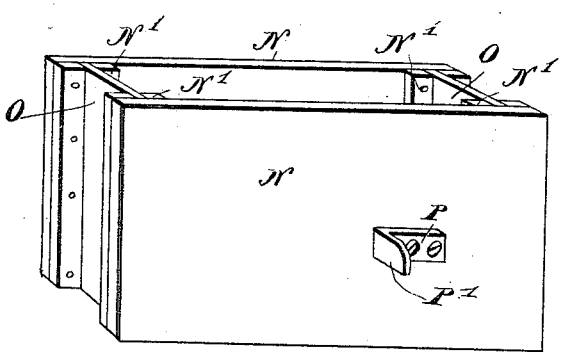
Witnesses,
J. F. Groat.
F. J. Kubiček.
Inventor:
Bert Butler,
By J. M. St. John
Atty.

No. 713,745. Patented Nov. 18, 1902.
B. BUTLER.
HAND CART.
(Application filed May 13, 1902.)

(No Model.) 2 Sheets—Sheet 2.

Witnesses
J. F. Groat.
F. J. Kubiček

Inventor.
Bert Butler,
By J. W. St. John
Atty.

UNITED STATES PATENT OFFICE.

BERT BUTLER, OF KENSETT, IOWA.

HAND-CART.

SPECIFICATION forming part of Letters Patent No. 713,745, dated November 18, 1902.

Application filed May 13, 1902. Serial No. 107,185. (No model.)

*To all whom it may concern:*

Be it known that I, BERT BUTLER, a citizen of the United States, residing at Kensett, in the county of Worth and State of Iowa, have invented certain new and useful Improvements in Hand-Carts, of which the following is a specification.

The object of this invention is to produce a hand-cart in which the carrying-platform may be raised or depressed by correspondingly depressing or raising the handles to render the cart convenient in loading and transportation.

The invention also contemplates the convenient mounting of a box on the platform and also the complete removal of the platform and its connections and the mounting of reel-standards, whereby a reel of wire or the like may be carried and manipulated.

The full nature of the invention will appear from the description and claims following, reference being had to the accompanying drawings, in which—

Figure 5:
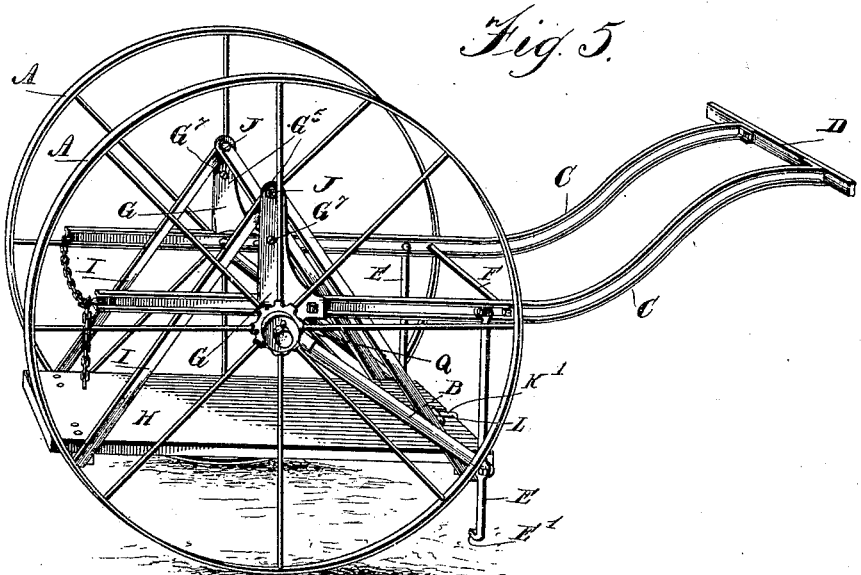
Figure 6:
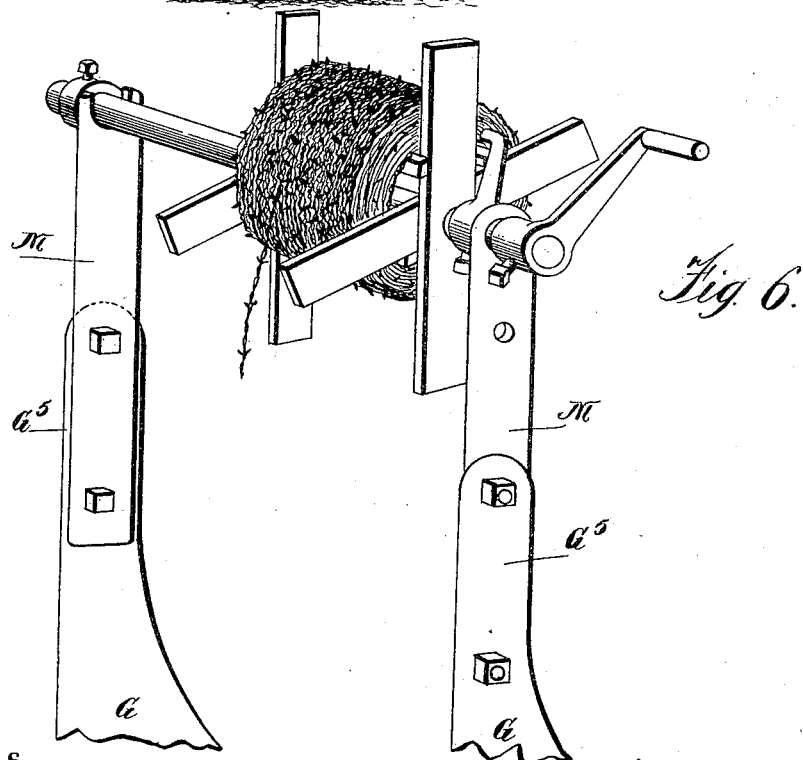

Figure 1 is a side view in perspective of a cart embodying my invention with the handles raised and the platform down. Fig. 2 is a view of a box for the same. Fig. 3 is a view in detail of the arm which supports the platform. Fig. 4 is a sectional view of the device for fastening the platform in normal position. Fig. 5 is a side view showing the platform up as in position for transportation. Fig. 6 shows the mounting of a wire reel and its supports on the arms that ordinarily support the platform.

In the drawings, A A designates a pair of wheels mounted on an arched axle B, the arch of which extends normally backward and downward, as shown in Fig. 5. Connecting with the axle is a pair of handle-bars C C, provided at the rear end with a cross-bar D, which serves as a handle in propelling the cart. A pair of vertical brace-rods E E connects the handle-bars with the rear portion of the axle, forming a triangular frame at each side of the cart. These brace-rods extend a short distance below the axle and are turned up to form feet $E'$, which serve as supports for the cart in its normal position. The handle-bars are also connected by a tie-rod F.

The connection of the axle and handle-bars is by a pair of castings G. These are each provided with a recess $G'$ to take the handle-bar, with holes at $G^2$ for bolts passing through the casting and handle-bar, as shown. Below this recess is a hole $G^3$ to take the outwardly-bent part of the axle and a diagonal recess $G^4$ to take the contiguous portion thereof extending downwardly and backwardly. The casting extends upwardly in an arm $G^5$, provided with holes $G^6$ and $G^7$. It will be understood that Fig. 3 shows the inner side of one of these castings.

The platform H is suspended from the arms $G^5$ by rods or bars I, converging at each side to the holes $G^6$, where bolts J pass through the three parts at each side of the cart. On these bolts as pivots the platform may swing up or down, as clearly indicated in Figs. 1 and 5.

When in normal position, the back end of the platform rests on the transverse portion of the axle-arch $B'$ and is locked in this position by a catch K, as shown in Fig. 4. The catch, as shown, has an axis or shaft $K'$ seated in a recess $H'$ in the platform and free to turn therein when drawn out to holding position. The terminal portion of the catch K is bent at an angle to the shaft and when down engages the axle, as shown. When turned up, the catch may be pushed forwardly, where it is prevented from dropping down by the sides of the recess in the platform. It is held in the recess by a cross-piece L and prevented from detachment by a head $K^2$. By this construction the platform may be lowered to the position shown in Fig. 1, when a barrel or other heavy article may be easily placed upon it. The operator then depresses the handles, when the cart takes the position shown in Fig. 5, the platform being locked in that position for greater security in moving it and its contents from place to place. By removing the pivot-bolts J J the platform may be quickly removed and a pair of standards M M bolted in place thereof, the supplemental holes $G^7$ serving for additional bolts in this case. On these standards may be mounted a reel of fence-wire or the like to be uncoiled by the movement of the cart.

In Fig. 2 is shown a removable box-body for the cart. This comprises a pair of sideboards N, provided with inner cleats $N'$ at each end, and end-boards O, fitting between said cleats. To each side-board is secured a bracket P, the lateral portion of which, P', fits in the space Q between the handle-bars and the axle. The box is easily put in place by first setting the side-boards in proper position and then slipping in the end-boards.

Having thus described my invention, what I claim as new, and desire to secure by Letters Patent, is—

1. In a hand-cart the combination with a pair of wheels, of a frame comprising a pair of handle-bars, a handle connecting them at the rear, connecting-castings provided with recesses to receive the handle-bars, and having subjacent holes and recesses, an arched axle having its ends bent at right angles and passing through the holes and supporting the wheels and having its contiguous portion fitted in said subjacent recesses, the axle thence inclined downwardly and rearwardly, braces connecting the handle-bars with the cranked portion of the axle and projecting below the same to form feet, said braces also forming, with the handle-bars and axle, a triangular frame at each side of the cart, whereby the angle adjacent to the castings is adapted for the application of supports upon a box, substantially as described, a platform provided at its rear with a catch adapted to engage the cross-bar of the axle to hold the platform stationary, and converging bars connecting the ends of the platform at each side with the upper ends of the castings above the axle, substantially as shown and described.

2. In a hand-cart, the combination of a pair of wheels an arched axle, the arch thereof projecting backwardly and downwardly with the transverse portion adapted to support the rear end of a platform, a frame comprising a pair of handle-bars and suitable connection with the axle, and a platform suspended from a point near the hubs of the wheels and adapted to swing in or out of engagement with the axle, substantially as described.

3. In a hand-cart, the combination of handle-bars, supporting-wheels, a downwardly and rearwardly extending cranked axle, castings connecting the handle-bars with the axle and projecting above the same, a platform suspended from said castings and provided at its rear end with a longitudinal recess, a cross-piece bridging said recess, and a catch sliding longitudinally in the recess and provided at its inner end with a head to abut against the cross-piece and limit its outward movement and at its outer end with a bent portion to engage the cross-bar of the axle and lock the platform thereto, the construction being such that the catch may be turned up and slid forwardly so as to bring the bent portion against the cross-piece, thus releasing the platform and securing the catch in retracted position, substantially as described.

In testimony whereof I affix my signature in presence of two witnesses.

BERT BUTLER.

Witnesses:
H. A. TUPPERUD,
O. A. NICKKELSON.